Patented Apr. 2, 1935

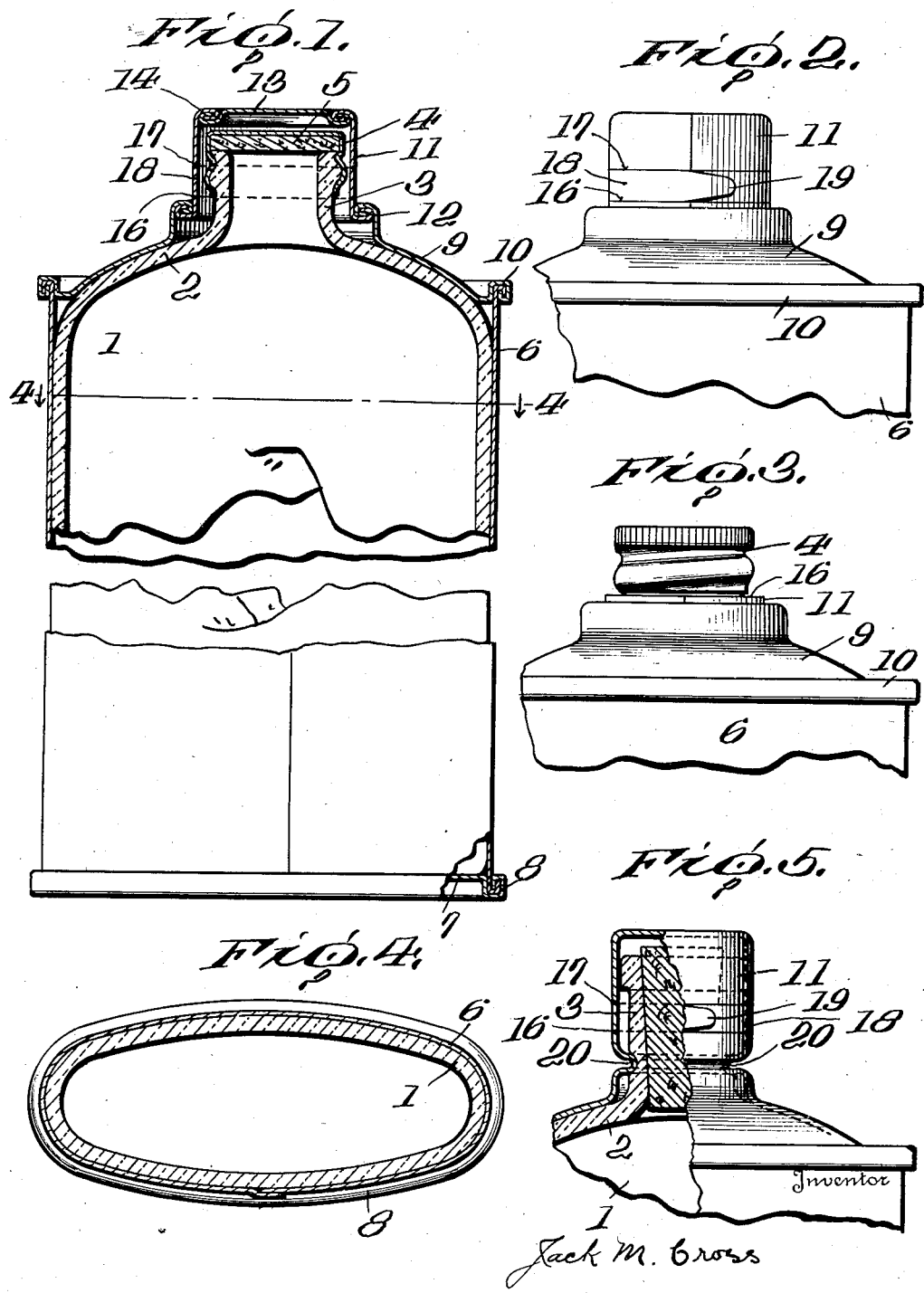

1,996,674

UNITED STATES PATENT OFFICE 1,996,674

TAMPERPROOF CONTAINER FOR DISTILLED LIQUORS

Jack M. Cross, New York, N. Y., assignor to Continental Can Company, Inc., New York, N. Y., a corporation of New York Application February 2, 1934, Serial No. 709,537

3 Claims. (Cl. 206—46)

The invention relates to new and useful improvements in a tamper-proof container for distilled liquors or the like. Efforts have been made to produce a container for distilled liquors which cannot be tampered with, by providing a metal closure for the container with a depending skirt which is secured to the neck of the container by a bending or spinning operation, and providing said skirt with a tearing strip which may be removed to give access to the contents of the container. Closures of this type, however, can be removed by straightening the metal so as to release it and, after the closure is removed, the contents of the container may be withdrawn and changed, after which the same closure can be re-attached to the container or a new closure can be supplied at little expense. Efforts have also been made to prevent tampering with the contents of a container for distilled liquors by enclosing a glass container therefor in a metal container having ends seamed thereto, which metal container is of uniform cross-section throughout and is provided with a tearing strip adjacent one of the end seams. It is very easy to withdraw the glass container from such a metal container after it has been opened and substitute another therefor with an inferior grade of liquor and dispense therefrom under the label on the metal container. Such a metal container is also objectionable as the glass container can only be opened after removal or partial removal from the outer metal container, and therefore the two containers cannot be permanently connected. Furthermore, there is an outstanding raw edge of metal that is likely to injure the hands in opening the container.

An object of the present invention is to provide a container for distilled liquors which includes an inner glass container and an outer metal container which completely encloses said glass container and which is so shaped that when the metal container is ruptured for giving access to the glass container within, the glass container and the metal container are still joined so that they cannot be separated from one another.

A further object of the invention is to provide a container of the above type which is so constructed that when said metal container is severed, the neck portion and the closure therefor of the glass container is exposed so that the glass container may be opened and the contents readily dispensed therefrom in the usual manner.

A still further object of the invention is to provide a container of the above type wherein the raw edge of metal produced by rupturing the metal container to open the same is protected by the projecting neck of the inner container.

In the drawing:

Figure 1 is a vertical sectional view through a portion of the container embodying the improvements.

Figure 2 is a view of the top of the container before the seal is broken.

Figure 3 is a view similar to Figure 2 but showing the tearing strip removed from the outer container and exposing the neck and closure of the inner container.

Figure 4 is a cross-sectional view through the container on the line 4—4 of Figure 3.

Figure 5 is a view partly in section showing a slightly modified form of container.

The invention has to do with a container for distilled liquors or the like which is tamper-proof. It includes an inner glass container of the usual construction. Said glass container has a body portion with a rounded shoulder at the top and a neck portion to which a closure is attached for sealing the same. The container for the distilled liquor also includes an outer metal container having a body portion of uniform cross-section conforming to the maximum cross-section of the glass container. A closure end is seamed to the lower end of this body portion and a closure end is seamed to the upper end of the body portion. Said upper end terminates adjacent the lower portion of the shoulder of the glass container and said upper closure end is shaped to conform to the shoulder of the glass container and the neck portion thereof. Said portion of the metal container housing the neck of the glass container is provided with a tearing strip having a projecting tongue on which a key may be placed or which may be grasped for rupturing the metal along score lines at the sides of the tearing strip. These score lines are formed in the metal adjacent the lower portion of the neck of the glass container so that when the tearing strip is removed and the released portion of the container removed, the neck and closure of the glass container will be exposed.

Referring more in detail to the drawing, the improved tamper-proof container includes an inner glass container 1 which may be of any desired cross-section but which is preferably oval in cross-section. The glass container is provided with a rounded shoulder 2 which terminates in a neck portion 3. This inner container as shown in Figures 1 to 3 of the drawing is closed by a screw cap 4 having a sealing gasket 5 which contacts with the lip of the glass container. The inner glass container is housed within a metal container which consists of a body portion 6 having an end closure 7 attached to the lower end thereof by a seam 8. The body portion and the end are preferably attached by a double seam produced by an interfolding of flanges on the body member and end closure, so as to make a tight joint. The body portion is of uniform cross-section and is dimensioned and shaped to conform to the maximum cross-section of the glass container 1.

The upper end of the body portion terminates adjacent the lower portion of the shoulder 2, that is, where said shoulder joins the body portion of the glass container. Secured to the upper end of the body portion 6 is an upper end closure 9 which is secured to the body portion by a similar double seam 10. This end closure 9 is curved to conform to the shoulder of the glass container and the metal container is preferably dimensioned so that when the bottom of the glass container rests on the lower end closure 7, this upper end closure 9 will contact with the shoulder 2 of the glass container. This will prevent any endwise movement of the glass container in the metal container.

Attached to this end portion 9 is a cylindrical portion 11 which conforms to the neck portion of the glass container and extends above the same. This cylindrical portion 11 is secured to the closure end 9 by a seam 12 formed by an interfolding of the metal parts. The outer end of the cylindrical portion 11 is closed by an end disk 13 which is secured to the cylindrical portion by a seam 14. This cylindrical portion 11 is preferably formed from a flat blank which is bent into cylindrical shape and the side edges thereof are joined by a seam 15. This seam is of the usual type for forming the bodies of cans and consists of interfolded sections or lapped sections which are secured so as to provide a permanent connection between the parts. While in the flat, the body portion of the cylindrical member 11 is scored along the lines 16 and 17. This forms a tearing strip 18 between the score lines, and the blank from which this cylindrical portion is made has a projecting tongue 19 in alignment with the tearing strip. The score line 16 is adjacent the seam 12 so that when a key is applied to the tongue and the tearing strip removed, substantially the entire neck portion of the inner glass container will be exposed and access may be readily had to the screw cap 5 for removing the same.

After the metal has been ruptured, the neck portion and closure of the inner glass container are exposed as noted, but the inner glass container cannot be removed from the outer metal closure because it is completely housed between the closure ends 7 and 9. The glass container itself can only be removed from the body portion of the metal container by a rupturing of the metal so that it can not be re-used. It will not be possible to refill the container and seal the same without there being clear evidence that the original package has been tampered with. The glass container will be firmly held from movement in the metal container and protected thereby. The glass container may, therefore, be made of light weight and of uncolored glass. Neither is it necessary to apply a label to the glass container as the permanently attached metal container may be labeled or decorated as desired. Furthermore, when the tearing strip is removed, the raw edge of the metal which is left exposed is close to the neck of the container and so positioned that the person opening the container or handling the same is not likely to be injured through contact with this raw edge of the metal.

The metal container described above is completed except for the attaching of the bottom closure end. The inner glass container, after it is filled and sealed, is placed in the metal container and then the lower closure end is secured to the body portion by seaming. This completes the package. Inasmuch as the glass container extends all the way from the upper closure end 9 to the lower closure end 7, it would not be practical to sever the metal of the body portion adjacent the lower double seam, change the contents of the glass container and then re-insert the glass container and close the metal container by re-flanging and attaching a new end thereto, as this would shorten the metal container and leave insufficient room for the glass container. It will be apparent, therefore, that a container for distilled liquors has been provided wherein it is practically impossible to gain access to and exchange the contents for an inferior grade of liquor without there being visible evidence of such tampering with the package.

In Figure 5 of the drawing there is shown a slightly modified form of construction wherein the glass container neck 3 is longer and is provided with an annular groove 20. After the glass container is inserted in the metal container, the cylindrical portion 11 in the region of the annular groove is beaded inwardly so as to lock the containers together. The lower end is then seamed onto the body portion of the metal container. This will prevent the severing of the body portion of the container adjacent the lower seam and the withdrawing of the inner glass container and the substituting of another therefor and then subsequently reclosing the lower end of the container. It is obvious that other ways may be used for interlocking the glass container with the metal container so that it cannot be removed, even by removing the lower end of said metal container.

Otherwise the structure shown in Figure 5 is similar to that shown in Figures 1 to 4 and described above.

It is obvious that minor changes in the shaping of the containers and the details of the construction used may be made without departing from the spirit of the invention as set forth in the appended claims. It is essential, however, that the metal container which encloses the inner glass container shall have its parts secured by seaming, or in some way so as to produce a permanent structure wherein the parts cannot be readily separated, and also that the containers shall be so constructed that they cannot be separated after the outer metal container has been opened.

Having thus described the invention, what I claim as new and desire to secure by Letters Patent, is:

1. A tamper-proof container for distilled liquors comprising an inner glass container having a shoulder and a neck portion, a closure for sealing said glass container, an outer metal container completely enclosing said glass container and the closure therefor, and having a body portion conforming in cross-section to the maximum cross-section of the glass container and terminating adjacent the lower portion of said shoulder, a closure end seamed to the lower end of said body portion, and a closure end seamed to the upper end of said body portion, said upper closure end being shaped to conform to the shoulder on the glass container and having a projecting closed cylindrical portion adapted to receive and house the neck portion of the glass container and the closure therefor, said projecting portion being provided with score lines disposed at a distance below the upper end of the neck portion of the glass container and forming a tearing strip which may be used for rupturing the metal of said outer container for uncovering and exposing the neck portion of the glass container and the closure therefor.

2. A tamper-proof container for distilled liquors comprising an inner glass container having a shoulder and a neck portion, a closure for sealing said glass container, an outer metal container completely enclosing said glass container and the closure therefor and having a body portion conforming in cross-section to the maximum cross-section of the glass container and terminating adjacent the lower portion of said shoulder, a closure end seamed to the lower end of said body portion, and a closure end seamed to the upper end of said body portion, said upper closure end being shaped to conform to the shoulder on the glass container, a cylindrical portion seamed to said end closure and extending beyond the closure for said glass container, a disk seamed to the outer end of said cylindrical portion for closing the same, said cylindrical portion having score lines formed therein setting off a tearing strip between the score lines which is provided with a projecting tongue adapted to receive a key for the rupturing of the metal along the score lines, said score lines being disposed a distance below the upper end of the neck portion of the glass container so that when the metal is ruptured and the upper part of the cylindrical portion removed, the neck portion of the glass container and the closure therefor will be exposed.

3. A tamper-proof container for distilled liquors comprising an inner glass container having a shoulder and a neck portion, a closure for sealing said glass container, an outer metal container completely enclosing said glass container and the closure therefor and having a body portion conforming in cross-section to the maximum cross-section of the glass container and terminating adjacent the lower portion of said shoulder, a closure end seamed to the lower end of said body portion, and a closure end seamed to the upper end of said body portion, said upper closure end being shaped to conform to the shoulder on the glass container and having a projecting closed cylindrical portion adapted to receive and house the neck portion of the glass container and the closure therefor, said projecting portion being provided with score lines disposed at a distance below the upper end of the neck portion of the glass container and forming a tearing strip which may be used for rupturing the metal of said outer container for uncovering and exposing the neck portion of the glass container and the closure therefor, said neck portion of the glass container and said projecting portion of the closure end having interengaging parts for permanently attaching said inner and outer containers together.

JACK M. CROSS.